(12) United States Patent
Lima et al.

(10) Patent No.: US 11,524,793 B2
(45) Date of Patent: Dec. 13, 2022

(54) KINETIC ENERGY TAXI SYSTEM AND THERMAL ENERGY RECOVERY SYSTEM

(71) Applicant: Embraer S.A., São José dos Campos (BR)

(72) Inventors: Daniel Bueno Silveira Lima, São José dos Campos (BR); Francisco Palazzo Neto, São José dos Campos (BR); Raphael Felipe Gama Ribeiro, São José dos Campos (BR); Sergio Gonçalves Da Costa, São José dos Campos (BR); William Martins Alves, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 8 days.

(21) Appl. No.: 17/129,034

(22) Filed: Dec. 21, 2020

(65) Prior Publication Data

US 2022/0194613 A1    Jun. 23, 2022

(51) Int. Cl.
| | |
|---|---|
| *B64D 31/00* | (2006.01) |
| *B64D 41/00* | (2006.01) |
| *B64D 35/02* | (2006.01) |
| *B64D 27/24* | (2006.01) |
| *B64D 31/06* | (2006.01) |
| *B60L 50/30* | (2019.01) |
| *B60L 8/00* | (2006.01) |
| *B64C 11/16* | (2006.01) |
| *B64D 27/10* | (2006.01) |
| *F02C 7/32* | (2006.01) |

(52) U.S. Cl.
CPC .............. *B64D 31/00* (2013.01); *B60L 8/006* (2013.01); *B60L 50/30* (2019.02); *B64C 11/16* (2013.01); *B64D 27/10* (2013.01); *B64D 35/02* (2013.01); *B64D 41/00* (2013.01); *B64D 41/007* (2013.01); *F02C 7/32* (2013.01); *B60L 2200/10* (2013.01); *B64D 27/24* (2013.01); *B64D 31/06* (2013.01); *B64D 2221/00* (2013.01); *F05D 2260/43* (2013.01)

(58) Field of Classification Search
CPC ........ B64D 35/02; B64D 35/08; B64D 41/00; B64D 27/24
See application file for complete search history.

(56) References Cited

U.S. PATENT DOCUMENTS

| | | | |
|---|---|---|---|
| 7,802,757 B2 | 9/2010 | Dooley et al. | |
| 2009/0218440 A1 | 9/2009 | Dilmaghani et al. | |
| 2010/0126178 A1* | 5/2010 | Hyde .................... | B64D 27/24 60/645 |
| 2017/0057650 A1* | 3/2017 | Walter-Robinson ........................ | H02J 7/0068 |
| 2017/0190441 A1* | 7/2017 | Mackin .................. | B64D 35/00 |

(Continued)

FOREIGN PATENT DOCUMENTS

CA            2947191 A1    7/2017

*Primary Examiner* — Timothy D Collins
*Assistant Examiner* — Justin Michael Heston
(74) *Attorney, Agent, or Firm* — Nixon & Vanderhye P.C.

(57) ABSTRACT

An aircraft with the capability of taxiing with main engines off uses the energy stored in a mechanical flywheel to power a propulsor(s) providing taxiing thrust. The flywheel can store energy generated by the propulsor operating as a wind turbine and/or by a power turbine in fluid coupling with the exhaust of a gas turbine engine and/or an expansion turbine operating with bleed and/or APU air.

19 Claims, 6 Drawing Sheets

(56) References Cited

U.S. PATENT DOCUMENTS

2017/0327219 A1* 11/2017 Alber ................... B64C 29/02
2018/0134397 A1   5/2018 Himmelmann et al.
2018/0283274 A1* 10/2018 Jackowski ............ F02C 7/36

* cited by examiner

KINETIC ENERGY TAXI SYSTEM AND THERMAL ENERGY RECOVERY SYSTEM

CROSS-REFERENCE TO RELATED APPLICATIONS

None.

STATEMENT REGARDING FEDERALLY SPONSORED RESEARCH OR DEVELOPMENT

None.

FIELD

The technology herein relates to aircraft power systems. More particularly, the non-limiting technology described herein relates to methods and systems for improving operation capabilities of an aircraft by repurposing recovering or reuse energy (e.g., thermal, mechanical, etc.) that is neglected and lost in the design of conventional aircraft operation procedures. The recuperated energy is intended to be used in conditions where normal engine functions (such as thrust, maneuvering, etc.) are excessive and/or wasteful; hence, novel approaches are developed and described herein. The technology herein further relates to the development of a Kinetic Energy Taxi System (KETS) and a Thermal Energy Recovery System (TERS), each aiming to provide better operational capabilities.

BACKGROUND & SUMMARY

Current commercial aircraft employ main propulsion engines to conduct taxi maneuvers (both acceleration and steady-state). The majority of engines powering commercial aircraft are based on gas turbines (Brayton cycle). The gas turbine thermal efficiency, a dimensionless performance measure, is driven primarily by cycle temperatures, pressures, and component efficiencies (i.e., of the compressors and turbines that are part of gas turbine engines.) The higher those parameters perform, the higher the gas turbine thermal efficiency, resulting in a desirable lower consumption of fuel.

Taxi power settings of a gas turbine engine are commonly close to the Ground Idle ratings, in which the engine speed, temperatures, pressures, and component efficiencies are degraded compared to high-power operations. Due to efficiency shortcomings, using the main (gas turbine) engines to provide thrust to the aircraft during ground operations is very inefficient. Typical thermal efficiency of gas turbines in idle operational conditions may range from 5-15%, while in high power operational conditions such as cruise, the thermal efficiencies are in the 35-55% range. Performance is typically proportional to the size of the considered turbo machine (smaller engines are generally less efficient due to size effects).

In regional aircraft that often fly shorter routes, the fuel consumption of ground maneuvers may represent a significant portion of the block fuel (i.e., mission fuel burn; sometimes defined as the total quantity of fuel in the aircraft's tanks prior to engine start). This type of aircraft is particularly sensitive to fuel consumption during the taxi phases. Since gas turbines are very inefficient at low power levels, it would be advantageous to employ a more efficient propulsion system for ground operations.

In addition to the block fuel issue described above, the use of combustion engines during ground operations increases noise and emissions in the airport's terminal areas. Propulsion systems which avoid the use of combustion engines such as gas turbine engines during ground operations may considerably reduce noise and emissions.

In recent decades, a number of system concepts have been developed in order to decrease fuel consumption during taxi operations. These concepts may be grouped in different basic approaches discussed in detail below. Described below also are example methods and systems of known ways of providing operational taxing capabilities to aircrafts, and their current limitations.

Wheel-Driven Electric Taxi

The basic idea behind a wheel-driven electric taxi concept is to install electric motors in the aircraft's wheels (nose and/or main landing gear). These electric motors provide torque to the wheels which then provide a propulsive force for ground operations. Electrical power needed to run the electric motors may be provided via the Auxiliary Power Unit (APU) generator and/or batteries or supercapacitors. Pros and cons of this methodology are discussed below.

Advantages:

The electric wheel motors have a greater efficiency (on the order of 85%-95%) when compared to gas turbines, especially when the gas turbine is operating at low power levels. This solution, when implemented in an aircraft, has the potential to decrease fuel consumption during ground operations.

Disadvantages:

Additional systems are required (Electrical motors, bigger APU, and APU generator, power electronics, cooling systems for the power controls, etc.)

Landing gears may need to be structurally reinforced to ensure safe operational conditions.

Due to the mentioned additional systems, costs and weight are added to the aircraft, sometimes offsetting the efficiency of the electric motor during the taxi phases, possibly affecting block fuel consumption marginally or even negatively.

Taxi performance may be degraded, since the motors will have limited power/torque capability (in order to avoid adding too much weight to the aircraft, rated power may be limited).

Electric Motors Installed Within the Gas Turbine Package

An electric motor may be installed in or on one of the shafts of a gas turbine engine. This electric motor is concentric with the gas turbine shafts, and may provide power to the propulsor (e.g., fan or propeller) during ground operations, while the thermal engine is off to save fuel. Pros and cons of this methodology are discussed below.

Advantages:

The electric wheel motors have a greater efficiency (on the order of 85%-95%) when compared to gas turbines, especially when the gas turbine is operating at low power levels. This solution, when implemented in an aircraft, has the potential to decrease fuel consumption during ground operations.

Does not require the installation of dedicated electric motors in the aircraft wheels/landing gears, since the thrust is generated via the propulsor (e.g., fan or propeller) of the main engine(s).

Disadvantages:

The solution needs to be designed into the gas turbine engine design from the start, since the electric motor is embedded within the gas turbine, resulting in significant impacts in the engine architecture. The solution is generally only applicable to new engine designs.

Maintainability of the embedded motor may be challenging, since it is installed within the gas turbine shafts. High operating temperatures may also be a challenge.

Using a Flywheel Device to Store Energy

Aiming to utilize an efficient energy source and drive, a flywheel may be considered, A flywheel is a spinning wheel, or disc, or rotor, rotating around a symmetry axis. Flywheels have been used for centuries on a variety of machines n modern times, a flywheel is typically placed on the output shaft of a combustion engine to smooth out rotational energy impulses the engine applies to the shaft (note: since typical gas turbine engines of the type used on jet aircraft typically offer continuous burn, they usually don't need flywheels as typical internal combustion engines do). Flywheels are both a storage device and a motor device. Mechanical energy is stored by providing high rotational speed to a certain rotating mass. Stored energy is proportional to the rotational speed squared and linearly proportional to wheel moment of inertia.

$$E_k = \frac{1}{2}I\omega^2$$

where:

$E_k$ is the amount of kinetic energy the flywheel stores.

I is the moment of inertia of the flywheel around its axis of symmetry, and

ω is the angular velocity.

The moment of inertia of the flywheel, which depends on the mass distribution over its the symmetry axis, is a measure of resistance to torque applied. on a spinning object (i.e. the higher the moment of inertia, the slower it will accelerate when a given torque is applied and the longer the mass will rotate when exposed to friction or other forces that tend to slow down).

What limits the component specific energy (amount of stored energy divided by component mass) is the centrifugal stress acting on the rotor material. If a particular flywheel is spun too fast, it will shatter or fly apart.

As depicted in the flywheel specific energy trends chart of prior art FIG. 1, conventional steel flywheels have a specific energy of only 30 Wh/kg. Advanced material flywheels are still under development, but potentially will be capable of surpassing the energy density of lithium-ion batteries, approaching 200 Wh/kg at the pack level. See e.g., J. G. Bitterly, "Flywheel technology: past, present, and 21st century projections" IEEE Aerospace and Electronic Systems Magazine (Volume: 13, Issue: 8, August 1998); R. Peña-Alzola et al, "Review of flywheel based energy storage systems", 2011 International Conference on Power Engineering, Energy and Electrical Drives (11-13 May 2011); S. J. DeTeresa, Materials for Advanced Flywheel Energy-Storage Devices, Cambridge University Press (29 Nov. 2013); Plater et al, Advances in Flywheel Energy Storage Systems, Active Power, Inc. (Darnell Group 2001). Advanced material flywheels such as silica and carbon nanotubes promise even higher energy storage.

Another inherent advantage of the flywheel versus the battery as an energy storage mechanism is much lower cost (both non-recurring and maintenance) associated with its implementation. These factors result in a much greater possibility of a favorable operating cost trade-off outcome.

In one example flywheel driven engine taxi system disclosed in CA2947191-A1, use of a flywheel device as an energy storage device for an aircraft has been proposed. In such implementation, energy stored in the flywheel device is converted to electrical energy via a generator which drives an electric motor. The electric motor is coupled to a gas turbine engine low pressure spool, driving the fan for taxing operations. Example pros and cons of such a proposed solution include:

Advantages:

Usage of a flywheel as an energy storage device avoids the use of expensive battery packs.

Potential for lower block fuel, especially for regional aircrafts.

Disadvantages:

The solution needs to be designed together with the engine design from the start, since the electric motor is coupled to a new tower shaft connected to the low-pressure spool making the solution only applicable to new engine designs.

An electrical generator and electrical motor are required to harvest mechanical energy from the flywheel, transforming it to electrical power which drives the motor—which leads to inefficiency. Additional to the added weight and conversion losses inherent from the generator and motor efficiencies, these components tend to be quite expensive (both recurring and maintenance), therefore adding a substantial cost factor to the overall aircraft design.

For other example systems that use a flywheel to store power, see e.g., D. W. Swett, "Flywheel charging module for energy storage used in electromagnetic aircraft launch system", IEEE Transactions on Magnetics (Volume: 41, Issue: 1, January 2005); D. A. Christopher, "Flywheel technology development program for aerospace applications," IEEE Aerospace and Electronic Systems Magazine (Volume: 13, Issue: 6, June 1998).

Air Bleed System Energy Recovery in addition to squandering of block fuel, current designs of Air Management Systems (AMS) waste thermal energy that could potentially be used to supply energy demands throughout the aircraft. Air is typically bled from the engine compressors in order to feed air cycle machines that provide adequate pressure and temperature for the cabin, cockpit, and baggage compartments. In order to comply with certification rules (e.g., AC 25.981 & 25.863), the engine bleed air must be cooled down (e.g., to 477K degrees) before being routed to the air cycle machines. That certification requirement aims to protect the aircraft from a bleed air duct failure, which could leak high temperature air (which can be as high as 700-800K degrees) to fuel tanks and aircraft structures, leading to hazardous flight conditions.

In order to lower bleed temperatures, a heat exchanger "pre-cooler") is employed. The source of air for the pre-cooler can be either ram air, collected via intakes placed on the aircraft structure, or air bled from the engine fan, which is blown across the pre-cooler and absorbs excess heat from the service bleed air. By performing heat exchange between the cold intake stream (ram air or fan bleed air) and the hot outlet stream (engine bleed air), the pre-cooler is capable of considerably lowering the temperature of the mixed air to safer working levels. However, in the process of cooling down the bleed air, a substantial amount of energy is wasted through the cold air stream which is ejected from the aircraft. It would be advantageous to recover the wasted energy and re-use it for aircraft energy demands including but not limited to energy needed for ground operations.

Turbo-Generator Based Bleed Air System

A prior non-limiting proposal provides a turbo-generation system aimed to harvest thermal energy from the engine bleed air stream and convert it into electrical power. The electrical power could then be routed to the aircraft electrical power distribution and generation system (EPDGS), contributing to the overall electrical system network and driving electrical loads. Pros and cons of that proposed solution are listed below.

Advantages:

Electrical energy generated by the turbo-generator is easily managed via power electronics—good coupling with the aircraft electric system.

Disadvantages:

An electrical generator is required to harvest thermal energy. Additional to the added weight and conversion losses from the generator efficiency, generators tend to be quite expensive (both recurring and maintenance), therefore adding a substantial cost factor to the overall aircraft design.

The system directs the harvested energy to the aircraft electrical system; it does not drive a propulsor which could lead to fuel savings (especially during taxi) or performance benefits (e.g., thrust augmentation, reducing the fuel flow requirement).

Systems described previously thus often employ electrical power to drive the aircraft wheels and/or propulsors in order to perform ground operations. Although electrical systems have several advantages, such as efficiency, controllability and reliability, they add considerable cost, both recurrent and maintenance, to the overall aircraft design. Further improvements are needed to overcome the problems and disadvantages of the prior systems proposed above.

BRIEF DESCRIPTION OF THE DRAWINGS

The following detailed description of exemplary non-limiting illustrative embodiments is to be read in conjunction with the drawings, of which.

DETAILED DESCRIPTION OF EXAMPLE NON-LIMITING EMBODIMENTS

Kinetic Energy Taxi System (KETS)

Figure 2:
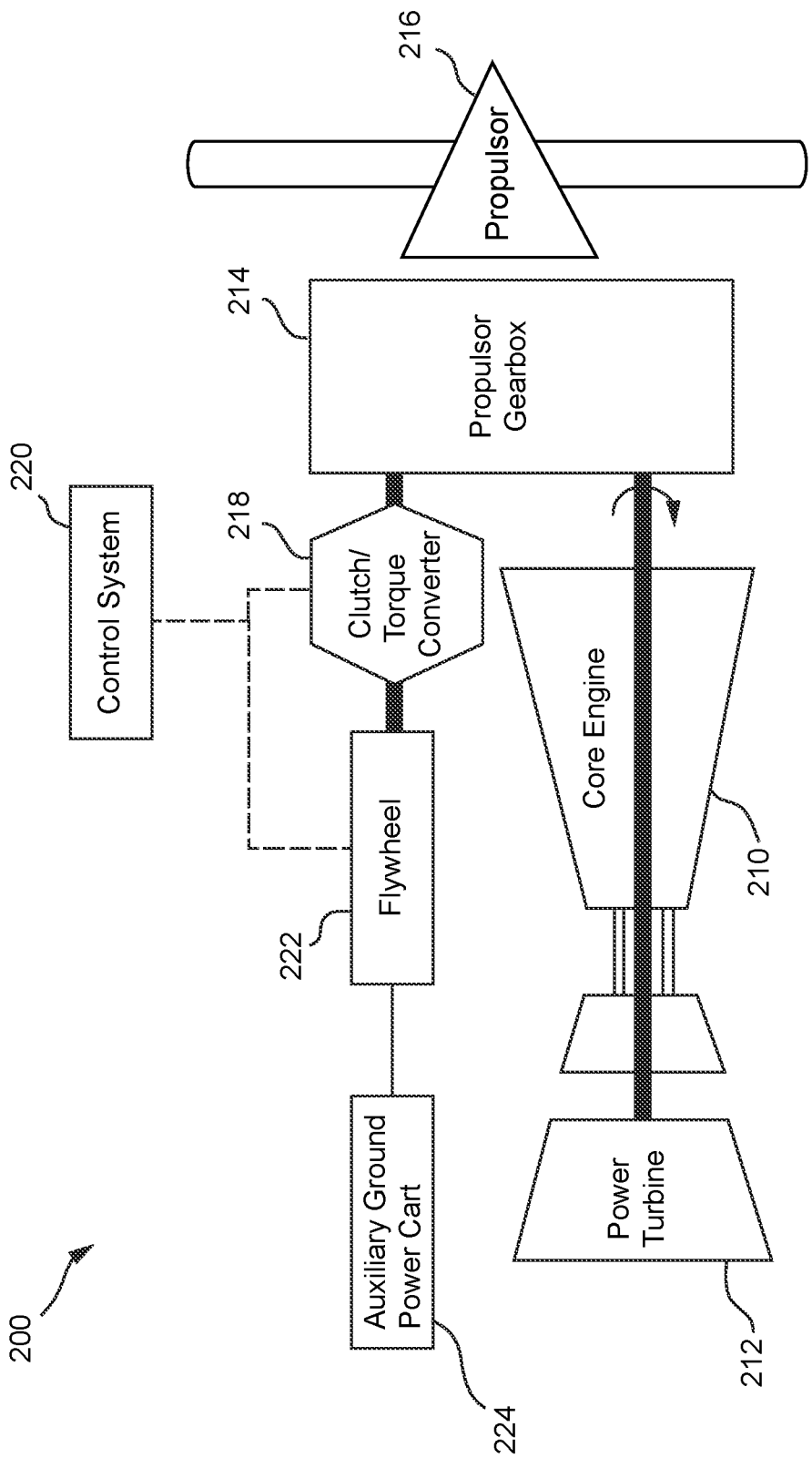
FIG. 2 shows a proposed schematic block diagram for a non-limiting example embodiment of the Kinetic Energy Taxi System ("KETS").

A schematic layout of an example non-limiting embodiment of a kinetic energy taxi system ("KETS") 200 is shown in FIG. 2. The KETS system 200 is installed on board an aircraft such as a jet or turbopropeller comprising a fuselage, a pair of wings each having at least one (and usually two or more) gas turbine engine 210 mounted thereon, control surfaces such as flaps and/or slats, a tail including a rudder, a cockpit, a passenger compartment, a cargo compartment and retractable landing gear.

KETS 200 in one non-limiting embodiment comprises a core engine 210. Core engine 210 may be a conventional gas turbine engine comprising a compressor, a combustion chamber, and a power turbine mechanically coupled to the compressor, or any other type of thermal engine. An additional, free power turbine (PT) 212 is mechanically decoupled from but aerodynamically (fluid) coupled to the core engine 210. In particular, in some example non-limiting embodiments, power turbine 212 is disposed in the exhaust air stream of the gas turbine engine 210 so it can harvest energy from the exhaust air stream by spinning in response to the force of hot gases the core engine 210 exhausts. In a different embodiment, the power turbine (PT) could potentially be built in as part of core engine 210 (e.g., so long as the core engine is designed from the beginning to supply auxiliary rotational power in this way).

In an example non-limiting embodiment, power turbine 212 is operationally coupled to a Propulsor Gearbox ("PGB") 214. Such coupling may be accomplished through a rotating shaft schematically illustrated in FIG. 2 as a dark bar. In one embodiment, this rotating shaft may be independent of any shaft within engine 210, and connect the power turbine 212 directly to the propulsor gearbox 214. The rotating shaft spins under the rotational force provided by power turbine 212, providing kinetic rotational energy to the input of propulsor gearbox 214. Propulsor gearbox 214 has an output that is mechanically coupled to a conventional propulsor 216 which may for example comprise a propeller, fan, etc.

During flight operations (e.g., take-off, climb, cruise, descent, approach and landing), fuel is provided to the core engine 210, which produces a hot, compressed gas output powering the power turbine 212 and thereby providing torque to the PGB 214. The PGP 214 in turn can provide torque to cause the propulsor 216 to rotate, generating propulsive thrust to help propel the aircraft. In some embodiments, the propulsor 216 can provide directional thrust to cause the aircraft to change direction e.g., including but not limited to during ground operations. In other examples, the propulsor 216 can provide axial (forward or backward) thrust that propels the aircraft along its main axis.

In the example shown, a clutch or torque conversion system 218 is coupled to a second rotatable shaft of the PGB 214, in parallel to the core engine 210. A further shaft mechanically couples a flywheel 222 to a clutch/torque converter 218. As is well known, a clutch and a torque converter are each devices that can be used to selectively couple one rotating/rotatable shaft to another rotating/rotatable shaft. In one example design, a clutch comprises some mechanism (e.g., friction plate, electromagnet, etc.) for selectively coupling and decoupling one rotatable shaft to another rotatable shaft. In some cases, a clutch comprises a release/engagement mechanism to selectively couple and decouple one shaft to another. In some cases, a clutch can provide a variable degree of coupling between the shafts so they don't have to rotate as precisely the same speed (e.g., when the clutch first engages coupling and a driven shaft first begins to rotate in order to synchronize its rotation with the rotation of a driving shaft.

A torque converter is a conventional device that typically includes a variable degree of coupling between a drive shaft and a driven shaft. One common design uses hydraulic (fluid) coupling. A typical torque converter may automatically engage and disengage power between a drive shaft and a driven shaft in relation to rpm of the drive shaft. As rotation speed of the drive shaft increases, internal fluid flow within a hydraulic torque converter creases sufficient force to transmit drive shaft power through the torque converter to the driven shaft. See e.g., Erjavec et al, Automotive Technology: A Systems Approach, pages 1302-1310 (2020).

In one embodiment, the system 200 uses a clutch instead of a torque converter. In another embodiment, the system 200 uses a torque converter instead of a clutch. In one embodiment, the system 200 uses both a clutch and a torque converter. In one embodiment, the system 200 uses an equivalent of a clutch and/or a torque converter. In various embodiments, the clutch and/or the torque converter 218 can be implemented using hydraulic, electromagnetic, magnetic, mechanical (e.g., friction plate) or any other conventional selective coupling technology to selectively couple rotational energy.

in some modes of operation, rotation of flywheel 222 can be transmitted through the clutch/torque converter 218 to the propulsor gearbox 214, which may in turn couple such rotational energy from the flywheel to the propulsor 216. In other modes of operation, the propulsor gearbox 214 may couple rotational energy from power turbine 212 and/or propulsor 216 (acting in this case as a wind turbine) through clutch/torque converter 218 to the flywheel 222 so the flywheel can store mechanical power. In still other operating modes, the clutch/torque converter 218 may decouple (and thus isolate) the flywheel from the propulsor gearbox 214.

In one embodiment, the propulsor gearbox 214 is a kind of transmission. In one embodiment, the housing of the propulsor gearbox 214 also houses the flywheel 222 and the clutch/torque converter 218.

In an example non-limiting embodiment, a control system 220 (see FIG. 4) manages the correct functioning of all sub systems. As discussed above the clutch/torque converter 218 may operate in response to commands from the control system 200 and/or it may operate autonomously in response to rotation of a driven shaft connected to it.

During ground operations (e.g., taxi-in, taxi-out, pushbacks, etc.), the core engine's 210 fuel supply is turned off. The mechanical energy stored in flywheel 222 is transferred via the torque conversion system 218 to the PGB 214, providing torque to the propulsor 216 at an adequate propeller rotational speed and direction. This results in the propulsor 216 propelling the aircraft during ground operations. The flywheel's 222 mechanical energy may be provided by an auxiliary ground power cart 224 coupled to the flywheel, or it may be harvested from flight operations, as described below.

During take-off and flight operations, with an operational core engine 210, the system may be operated in any of three different modes:

Regeneration mode: the clutch/torque conversion system 218 is engaged so that rotational energy it provides mechanically recharges the flywheel 222. Rotational kinetic energy outputted by power turbine 212 harvesting energy from the core engine 210 and/or outputted by propulsor 216 acting as a wind turbine, is coupled by propulsor gearbox 214 and clutch/torque converter 214 to the flywheel 222, allowing the flywheel to store energy for the next taxi cycle(s).

Power mode: the torque conversion system 218 directs energy from the flywheel 222 to the PGB 214 which in turn drives the propulsor 216, thus augmenting propulsor thrust at selected flight conditions, such as take-off or climb.

Disconnect mode: the torque conversion system 218 disconnects the flywheel 222 from the PGP 214, allowing the flywheel 222 to continue to rotate unimpeded (except by friction of the flywheel system itself), thereby storing energy for future conditions where the energy can be used to power the propulsor 214 through the PGB 214.

Figure 5A:
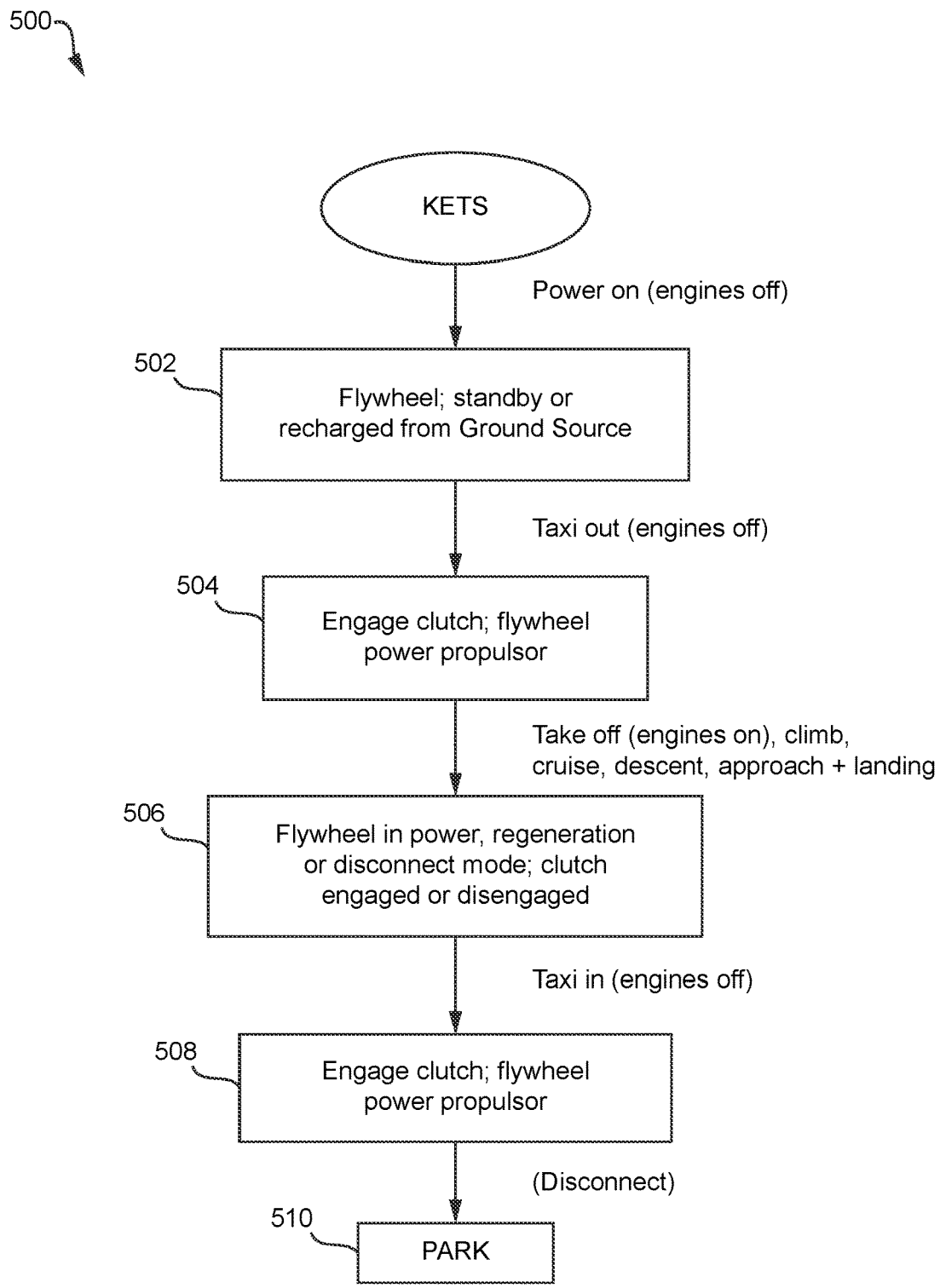
FIG. 5A is a non-limiting flowchart of example operations performed by an example KETS system.

FIG. 5A shows example operating steps for KETS 200 on an example non-limiting representative aircraft flight. These operating steps may be implemented by the control system 220 executing instructions stored in non-transitory memory.

When the aircraft is first powered on but no fuel is yet applied to the engine 210, the flywheel 222 may be in standby or recharged from a ground source such as the auxiliary ground power cart 224 (block 502). Once the flywheel 222 is recharged, the clutch/torque converter 218 may be engaged to couple the flywheel to the propulsor 216 via the PUP 214) so that the propulsor 216 can provide thrust to taxi out the aircraft under propulsor power with core engine 210 still off (block 504).

When the aircraft has taxied to the runway threshold and the engines are over blast pads, the pilot turns the engines 210 on to ready the aircraft for takeoff. See block 506. Depending on usage, the KETS 200 may operate in the power, regeneration or disconnect mode with the clutch 218 engaged or disengaged, depending on need. Control system 220 can switch between such modes during or depending on phases of flight such as climb, cruise, descent, and approach and landing, depending on predetermined programmed operations and/or pilot commands. For example, if the aircraft will rely solely on power from engines 210 during a particular flight phase, the regeneration or disconnect mode may be used. If the aircraft will rely on supplemental thrust from the propulsor 216 during a particular flight phase, the power mode may be used. Alternatively, the flywheel 222 power can be regenerated in preparation for later use a described herein.

Once the aircraft lands, the pilot may cut off the engines 210 for taxi in. If the regeneration mode was used previously during approach and landing, the flywheel 222 will have stored energy that may now be coupled to the propulsor 216 via an engaged clutch 218 and propulsor gearbox 214, providing thrust for taxiing the aircraft to the gate or hangar (block 508). When the aircraft is to come to rest, the control system 220 can control the clutch 218 to disengage, thus operating in the disconnect mode and stopping rotation of the propulsor 216 for parking (block 510).

The example non-limiting method described above is summarized in Table 1 below:

TABLE 1

KETS operating modes (method)

| # Ref | Mission Phase | Flywheel | Clutch | Main Engines |
|---|---|---|---|---|
| 01 | Power-on | Stand by or recharged from ground source | Disengaged | OFF |
| 02 | Taxi-out | Power mode | Engaged | OFF |
| 03 | Take-off | Power, regeneration or disconnect mode | Engaged or disengaged | ON |
| 04 | Climb | Power, regeneration or disconnect mode | Engaged or disengaged | ON |
| 05 | Cruise/Descent/ Approach & Landing | Power, regeneration or disconnect mode | Engaged or disengaged | ON |
| 06 | Taxi-in | Power mode | Engaged | OFF |

Other thermal engines may be considered core engines 210, such as piston engines (rotatory or alternating), etc.

Other core engine 210 arrangements may be considered, including two or more shaft architectures, often found in gas turbine engines.

The referred propulsor 216 may be a Propeller (ducted or un-ducted, single plane or multi-planes, co-rotating or contrarotating) or a Fan.

The torque conversion system 218 may be of various types and natures, such as mechanical, hydraulic or electromagnetic.

Additional uses of the system 200 as a flight control system may be considered. For example, since the flywheel 222 will present high inertia moments, these moments can be used coupled with rotation on another axis(es) to generate gyroscopic loads, which can help to maneuver the aircraft, reducing the need of flight control surfaces and therefore decreasing trim drag.

Expected Benefits of KETS Implementation

The flywheel/propulsor driven taxi have the potential to decrease the Block Fuel consumption of the aircraft, increasing the aircraft efficiency and competitiveness.

The flywheel 222 and the PGB 214 have two main functions: propel the aircraft during ground or flight operations (power mode), and harvest energy from the engine at peak efficiency conditions and/or from the propulsor 216 acting as a wind turbine. Therefore, the same machine is used for several purposes—in other words, the system does not require the installation of dedicated electric motors to perform the taxi maneuvers as required by many prior wheel-driven electric taxi systems.

Figure 1:
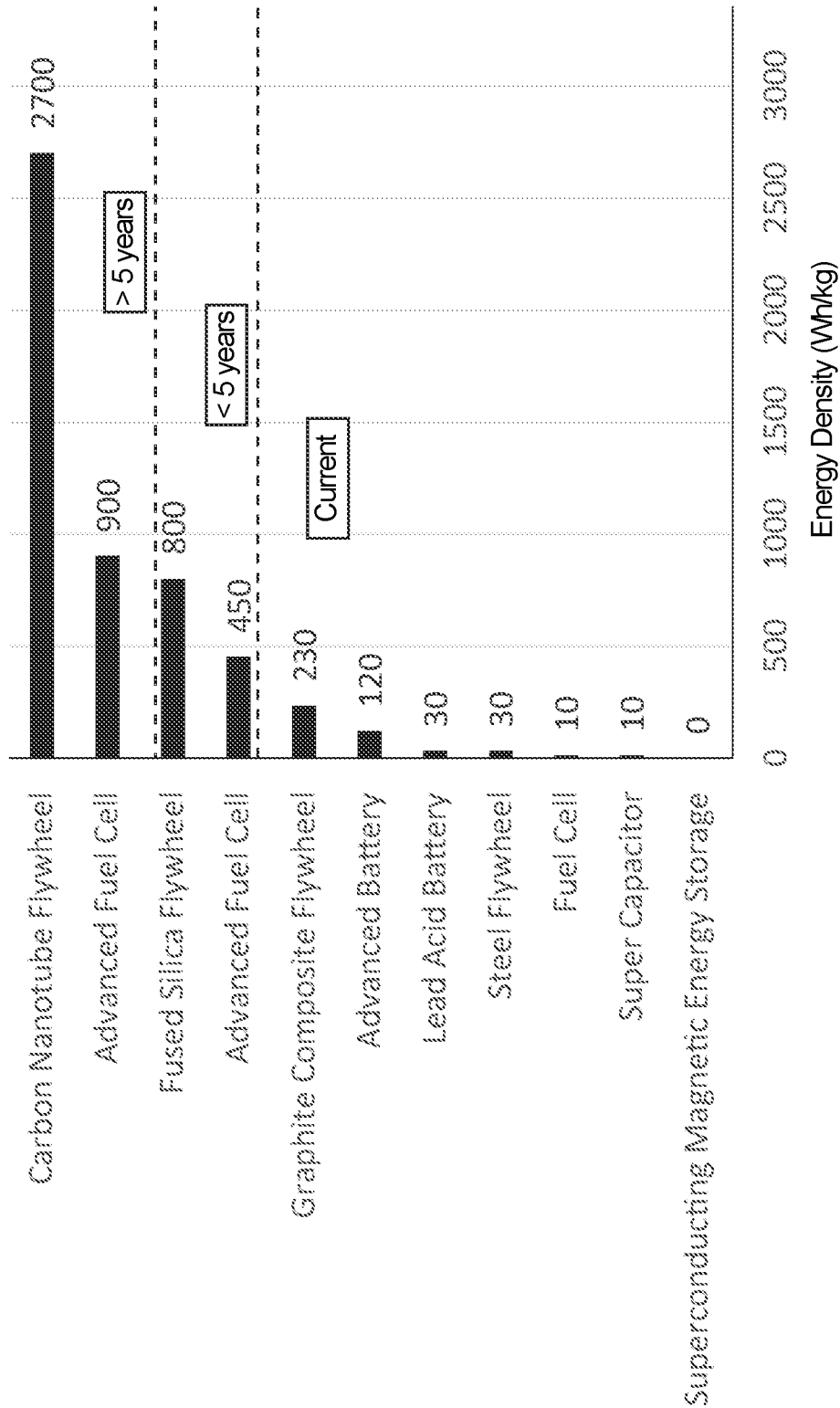
FIG. 1 (prior art) shows example energy trends of different flywheels.

According to expert's forecasts (see FIG. 1 flywheel specific energy trends chart), flywheel specific energy is expected to improve considerably in the near future, making it lighter than batteries for the same amount of stored energy, and with much lower acquisition and maintenance costs.

No additional electrical equipment is required (such as generators, batteries, electric motors)—this equipment tends to be very expensive (both to acquire and maintain.)

The flywheel 222 and torque conversion system 218 in some embodiments may be installed within the PGB 214 in parallel with the main thermal engine 210, avoiding impacts in the main engine architecture. In other words, the thermal engine 210 architecture can be designed as a conventional engine, without having to add or accommodate required mechanical installation of electric motors in the engine shafts (as required in systems which employ an electric motor concentric to the gas turbine shafts or with tower shafts). Maintainability of the PGB gearbox 214 is also easier when compared to the concentric installation of an electric engine. In other embodiments, the core engine is redesigned and/or modified to accommodate the technology herein.

There is the potential to perform the push-back maneuver using the proposed system. Since the tug-driven push-back maneuver has an associated cost, the system 200 has the potential to dismiss the tug and push the aircraft autonomously, potentially reducing other operational costs than those associated with fuel consumption. In such pushback operations, the PGP 214 can drive the propulsor 218 to a reverse pitch setting to apply backward axial thrust (i.e., thrust along the long axis of the aircraft with the thrust direction being toward the tail of the aircraft) instead of forward thrust (i.e., the thrust direction being toward the nose of the aircraft).

Thermal Energy Recovery System (TERS)

Figure 3:
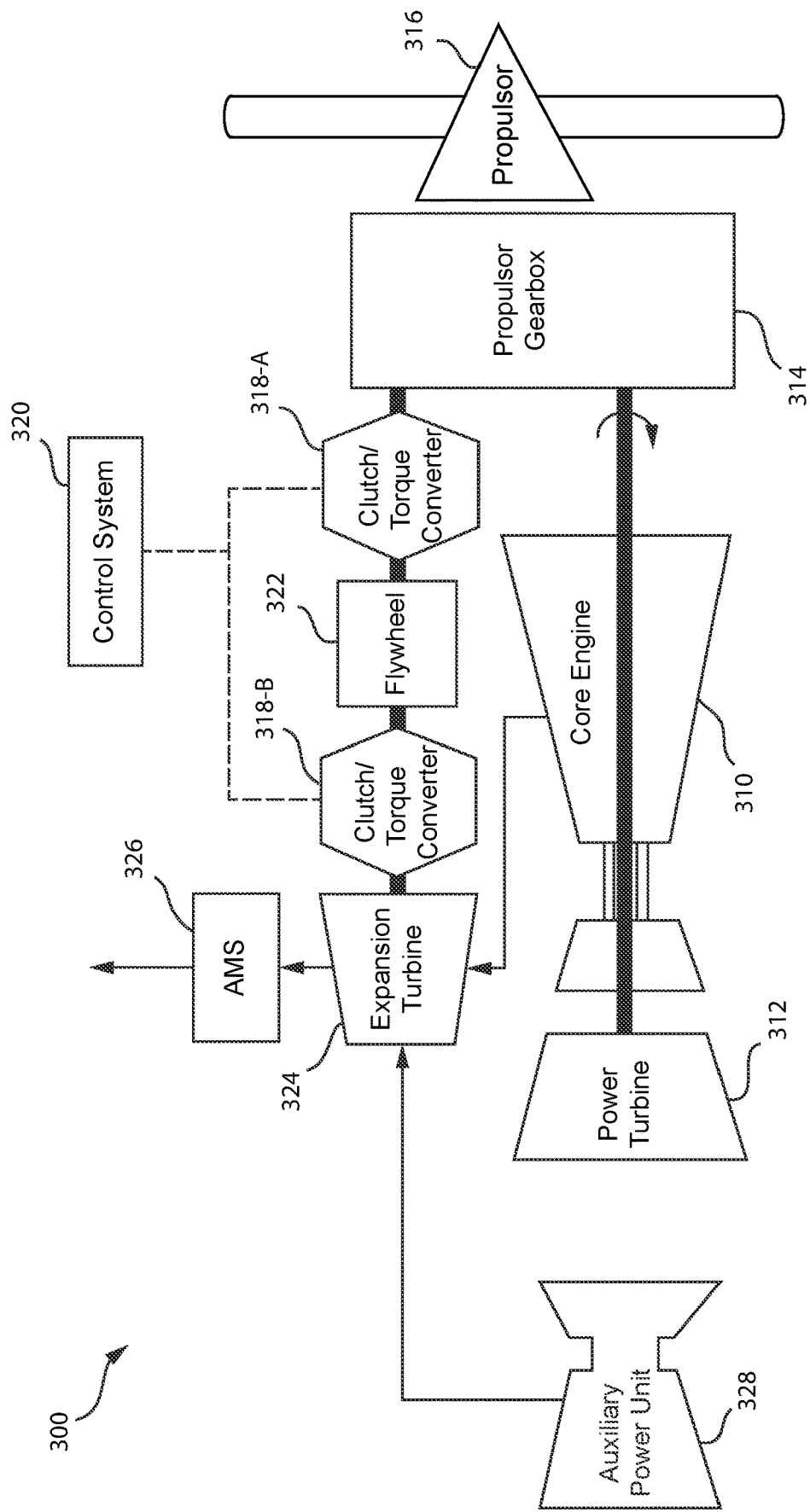
FIG. 3 shows a proposed schematic block diagram for a non-limiting example embodiment of the Thermal Energy Recovery System ("TERS").

A schematic layout of an example non-limiting thermal energy recovery system ("TERS") 300 embodiment is shown in FIG. 3. There are similarities between systems 200 and 300 in one embodiment, with FIG. 2 components 210-222 described above corresponding to FIG. 3 components 310, 312, 314, 316, 318-A, 320, 322, respectively (i.e., core engine 210 corresponds to core engine 310, power turbine 212 corresponds to power turbine 312, etc.). FIG. 3 shows (and the TERS system 300 includes) additional components (318-B, 324, 326, 328) not shown/included in the FIG. 2 system 200 to enhance/enable thermal recovery mode by recovering energy from exhausts relating to cooling bleed air for the air management system, as will be described below.

In more detail, the TERS system 300 is comprised of a conventional core engine 310 which in one embodiment may comprise a compressor, combustion chamber and a turbine mechanically coupled to the compressor. A free power turbine (PT) 312, mechanically de-coupled, but aerodynamically coupled to the core engine 310 (i.e., positioned to receive exhaust gases from the core engine) is operationally connected to a Propulsor Gearbox (PGB) 314 via a rotatable shaft in one example.

In the FIG. 3 example shown, an additional clutch/torque converter 318-B is used to selectively couple flywheel 322 to an expansion turbine 324. Expansion turbine 324 may be disposed in the path of hot bleed air supplied by engine 310 that is cooled by a pre-cooler as described above. The expansion turbine 324 is coupled to an air management system (AMS) 326 that receives the hot/cooling bleed air. In one embodiment, the expansion turbine 324 may also be coupled to an auxiliary power unit (APU) 328 which supplies compressed air to the AMS 326 during ground operations (e.g., before the engine 310 is started).

As in the previously described example, during ground operations (e.g., taxi-in, taxi-out, push-backs, etc.) the core engine's 310 fuel supply is turned off. The mechanical energy stored in the flywheel 322 is transferred via the torque conversion system 318-A to the PGB 314 providing torque to the propulsor 316 at the adequate propeller rotational speed. This results in the propulsor 316 propelling the aircraft during ground operations. The flywheel's 322 mechanical energy source may be provided by an auxiliary ground power ("huffer") cart 224 (otherwise known as the "air start unit", this cart supplies compressed air to start core engine 310 when the APU 328 is unavailable) (see FIG. 2), harvested from previous flight operations, or in the case of FIG. 3, by connecting the flywheel 322 to an expansion turbine 324, if the Air Management System (AMS) 326 is fed from an Auxiliary Power Unit (APU) 328 during ground operations. As is well known, the APU 328 is a small engine typically located in the tail of the aircraft that can be used to provide compressed air for various purposes including stalling core engine 310 and supplying compressed air to AMS 326 before (or whenever) the core engine 310 does not supply bleed air to the AMS.

During flight operations (e.g. take-off, climb, cruise, descent, approach and landing), fuel is provided to the core engine 310, which produces a hot, compressed gas output, which powers the power turbine 312, providing torque to the PGB 314 and to the propulsor 316, generating propulsive thrust to propel the aircraft. A clutch or torque conversion system 318-A is coupled to the PGB 314, in parallel to the engine core 310. In the FIG. 3 example, additional clutch or torque conversion system 318-B couples the flywheel 322 to the expansion turbine 324. During flight, the expansion turbine 324 delivers bleed air within temperature certification requirements to the Air Management System 326, which provides adequate pressure and temperature control to the aircraft cabin, cockpit and baggage compartment. A control system 320 manages the correct functioning of all sub systems.

During take-off and flight operations, with an operational core engine 310, the system may be operated in different modes, as described below:

Stand-by mode (S-by), wherein at low power levels, the core engine 310 bleed temperature is within the certification range, and the bleed pressure is very low, not expanding on the turbine. In "S-by" or standby mode, torque converters 318-A and 318-B are open (disengaged).

Power mode #1 (Pwr #1), AMS 326 operating, both torque conversion systems (318-A and 318-B) direct energy from the expansion turbine 324 to the PGB 314, augmenting propulsor thrust at selected flight conditions, such as take-off or climb. In Pwr #1 mode, the flywheel 322 is acting as a shaft to rotationally couple the expansion turbine 324 to the PGB 314 and the propulsor 316.

Power mode #2 (Pwr #2), AMS 326 inoperative, torque converter 318-B is disengaged and torque converter 318-A is engaged, transferring flywheel 322 energy to the propulsor 316 via the PGB 316.

Thermal recharge mode (T-gen), where the torque conversion system 318-B recharges the flywheel 322 with energy harvested from the expansion turbine 324, preparing the flywheel 322 for the next taxi or other power cycle(s). In T-gen mode, torque converter 318-A is disengaged from the PGB 314.

Kinetic recharge mode (K-gen), where at low power levels with considerable forward velocity (such as descent, approach and landing), the core engine 310 bleed temperature is within the certification range, and the bleed pressure is very low, not expanding on the turbine. In K-gen mode, torque converter 318-B is open (disengaged) and torque converter 318-A is engaging the POB 314 to the flywheel 322. In this condition, the propulsor 316 is acting as a wind turbine, transferring the aircraft kinetic energy to the flywheel 322

Disconnect mode (Disc), wherein the torque conversion system 318-A, disconnects the flywheel 322 from the PGB 314 (and 318-B may also disconnect the flywheel from the expansion turbine 324), allowing the flywheel 322 to store energy for a future condition where energy will power the PGB 314. This may be useful while the aircraft is performing boarding/un-boarding conditions during its turn-around phase.

Other thermal engines may be considered as core engines 310, such as piston engines (rotatory or alternating), etc. In that case, engine exhaust gases may be directed to the expansion turbine 324.

Other core engine arrangements may be considered, including two or more shaft architectures, often found in gas turbine engines.

The referred propulsor 316 may be a Propeller (ducted or un-ducted, single plane or multi-planes, co-rotating or contra-rotating) or a Fan.

The torque conversion system 318 may be of various natures, such as mechanical, hydraulic or electromagnetic.

An additional use of the system as a flight control system may be considered. Since the flywheel 322 will present high inertia moments, these moments can be used coupled with a rotation on other axis to generate gyroscopic loads, which can help to maneuver the aircraft, reducing the need of flight control surfaces and therefore decreasing trim drag.

Figure 5B:
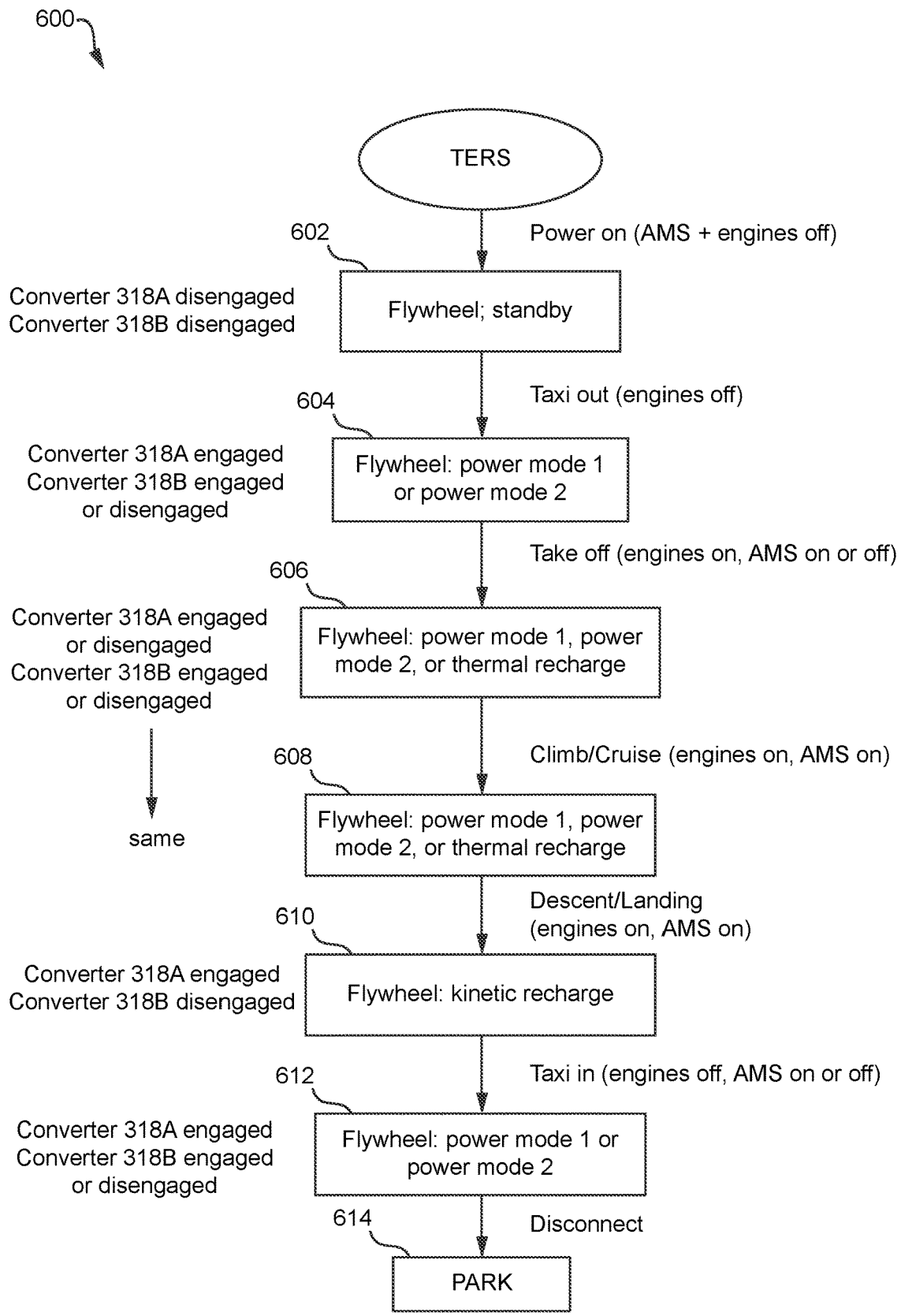
FIG. 5B is a non-limiting flowchart of example operations performed by an example TERS system.

FIG. 5B shows example non-limiting operations of the TERS system 300 for different phases of flight. As discussed above, the flywheel 322 is in standby mode with converters 318A, 318B disengaged before pushback, or 318B may couple the expansion turbine to the APU 328 and/or to cart 224 in order to supply torque to regenerate flywheel rotation).

At taxi-out, the core engines 310 remain off and clutch/converter 318A is engaged to apply power from the flywheel 322 through PGB 314 to propulsor 316 (power mode 1 and power mode 2). If the system 300 is operating in power mode 1 as opposed to power mode 2, clutch/converter 318B is also engaged such that flywheel 322 (now spinning based on torque provided by APU 328) acts as a shaft to pass rotational power from expansion turbine 324 to power the propulsor 316.

During takeoff, climb, and cruise with engine 310 on, the system 300 may operate as described above in connection with power mode 1 or power mode 2 and in addition, it may operate in the thermal recharge mode in which converter 318A is disengaged and converter 318B is engaged to apply power from the expansion turbine 324 to recharge flywheel 322 from bleed air provided by engine 310. During descent/landing, converter 318A may be engaged to allow propulsor 316 to operate as a wind turbine to recharge the flywheel 322 in the kinetic recharge mode in order to store energy in the flywheel needed for taxiing. During taxi-in with engine 310 off, the system 300 can operate in power mode 1 or power mode 2 depending for example on whether the AMS 326 (operating based on compressed air supplied by APU 328) is on or off.

The method described above is summarized in Table 2.

TABLE 2

TERS System operation summary

| Mission Phase | Flywheel | Converter 318-B | Converter 318-A | AMS | Main Engines |
|---|---|---|---|---|---|
| Power-on | S-by | Disengaged | Disengaged | OFF | OFF |
| Taxi-out | Pwr#1 or Pwr#2 | Engaged (#1) or Diseng (#2) | Engaged | ON (APU) or OFF | OFF |
| Take-off | Pwr#1 or Pwr#2 or T-gen | Engaged (#1, T-gen) or Diseng (#2) | Engaged (#1, #2) or Diseng (T-gen) | ON or OFF | ON |
| Climb/Cruise | Pwr#1 or Pwr#2 or T-gen | Engaged (#1, T-gen) or Diseng (#2) | Engaged (#1, #2) or Diseng (T-gen) | ON | ON |
| Descent/Landing | K-gen | Disengaged | Engaged | ON | ON |
| Taxi-In | Pwr#1 or Pwr#2 | Engaged (#1) or Diseng (#2) | Engaged | ON or OFF (APU) | OFF |

Expected Benefits: TERS

The flywheel/propulsor driven taxi has the potential to decrease the Block Fuel consumption of the aircraft, increasing the aircraft efficiency and competitiveness.

The system can be used to redirect power from the bleed air to the propulsor, lowering the fuel flow required for a given net thrust requirement.

The flywheel 322 (which may be disposed within the PGB 314) has two main functions: propel the aircraft during ground or flight operations (power mode), and harvest energy from the expansion turbine 324, which lowers the bleed air temperature to comply with certification requirements, or from the propulsor 316 acting as a wind turbine. Therefore, the same machine is used for several purposes—in other words, the system does not require the installation of dedicated electric motors to perform the taxi maneuvers (as required in the wheel-driven electric taxi).

According to expert's forecasts (see flywheel specific energy trends chart of FIG. 1), flywheel specific energy is expected to improve considerably in the near future, making it lighter than batteries for the same amount of stored energy, and with much lower acquisition and maintenance costs.

No additional electrical equipment is required (such as generators, batteries, electric motors)—this equipment tend to be very expensive (both to acquire and maintain)

The flywheel 322, expansion turbine 324 and torque conversion systems 318A, 318B in one embodiment are installed within the PGB 314 in parallel to the main thermal engine 310, avoiding impacts in the main engine architecture. In other words, the thermal engine architecture can be designed as a conventional engine, without having the need to provision mechanical installation of electric motors in the engine shafts (as required in the systems which employ an electric motor concentric to the gas turbine shafts or with tower shafts). Maintainability of the PGB 314 is also easier when compared to the concentric installation of an electric engine.

As with system 200, there is the potential for system 300 to perform the push-back maneuver using the proposed system; since the tug—driven push-back maneuver has an associated cost, the system has the potential to dismiss the tug and push the aircraft autonomously, potential reducing other operational costs than those associated with fuel consumption.

Various modifications of system 300 of FIG. 3 are possible. For example, in one embodiment, the power turbine 312 and associated shaft is omitted, and the expansion turbine 324 and/or the propulsor 316 acting as a wind turbine are used to recharge flywheel 322. In one embodiment, the expansion turbine 324 and the power turbine 312 are both omitted, and the propulsor 316 is used to both recharge the flywheel in kinetic recharge mode, and to be powered by the flywheel in power mode 2. Thus, the various modes shown in Table II are non-limiting; particular implementations can offer one, two, three, four, five or all six modes.

While the explanations above refer to a "core engine" 210, 310, it will be apparent that commercial aircraft usually have more than one core engine 210, 310. Accordingly, any particular aircraft can have only one system 200, 300 designed to operate on one of its engines, or two systems 200, 300 each designed to operate with a different engine, or so on. In a multi-engine/multi-system arrangement, there can be mechanical coupling between the multiple systems 200, 300 so that if one system fails, a non-failed additional system can supply rotational power to multiple propulsors 216, 316.

Example Non-Limiting Control System

Figure 4:
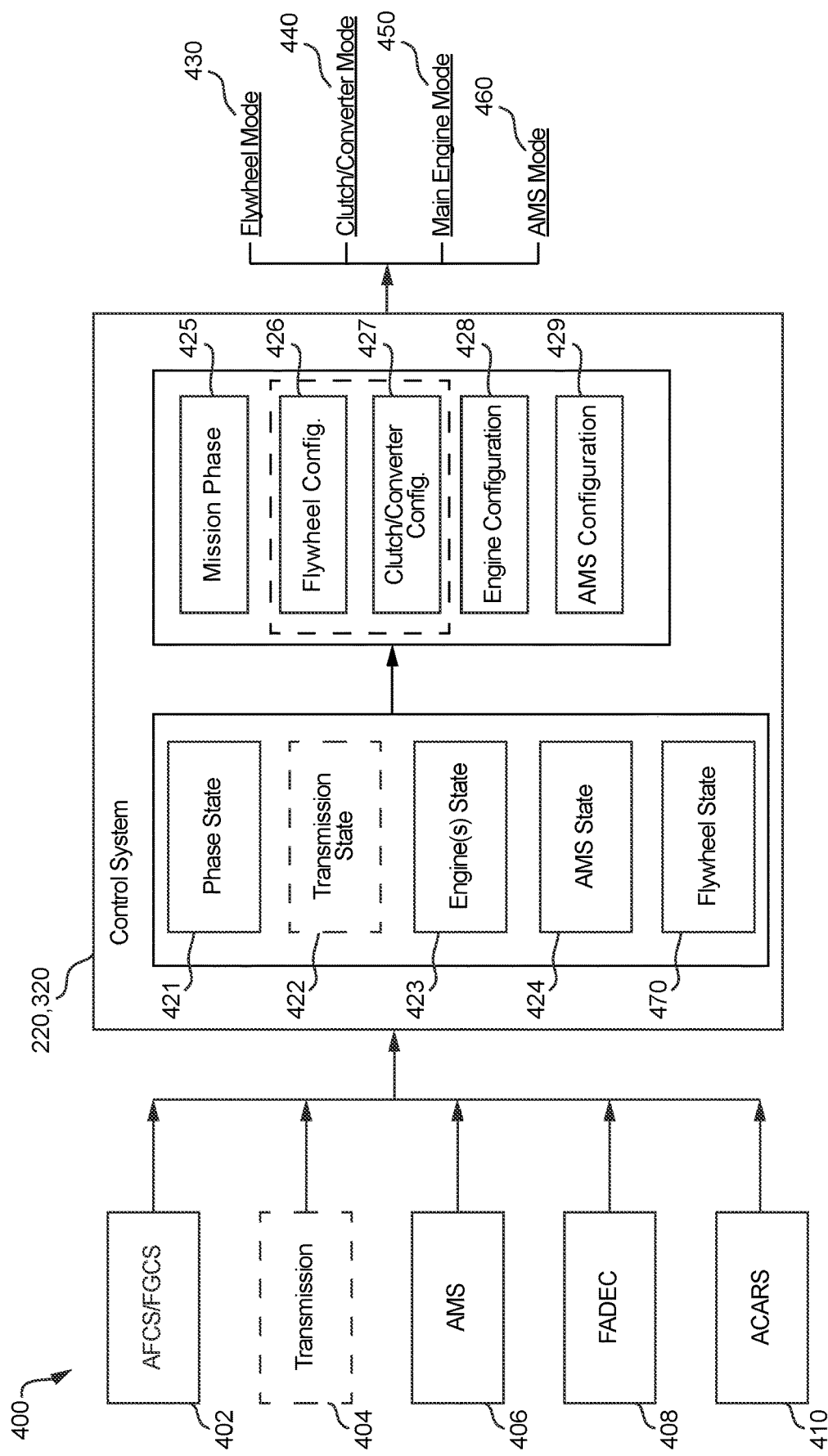
FIG. 4 is a non-limiting example embodiment of a control system that may be used to control KETS and/or TERS.

FIG. 4 is a non-limiting example schematic of an example non-limiting Control System 400 for use as control system 220 and/or 320. Control system 400 may be based upon or comprise one or more CPUs, GPUs or other processors or electronic controllers capable of performing steps e.g., under control of software instructions 220, 320 stored in non-transitory memory(ies) coupled to the processors/controllers. The Control System 400 is configured to manage adequate operational configurations of the KETS/TERS based on current operational conditions.

The controller 220, 320 of the Control System 400 is provided various data inputs from various systems and sub-systems to determine appropriate KETS/TERS mode. The controller 420 is capable of determining and storing:
a flight phase state 421,
a transmission state 422,
an engine state 423,
an AMS state 424, and
a flywheel state 470.

The controller 220, 320 can determine such states based on state signals from aircraft sub-systems such as 402-410 and/or sensors. As one example, a rotational shaft encoder sensor may be coupled to the flywheel 222, 322 to monitor the speed of rotation of the flywheel. By monitoring the output of such a rotational shaft encoder sensor, the controller 220, 320 can determine whether the flywheel 222, 322 is rotating and if so, how fast the flywheel is rotating. Based on such determination, the controller 220, 320 can automatically determine whether the system 200, 300 needs to switch into a thermal or kinetic recharge mode to apply (more) power to the flywheel 222, 322 to cause the flywheel to store more rotational energy in preparation for a near-future situation (e.g., taxiing) when energy from the flywheel will be used to rotate the propulsor 216, 316.

For example, in one non-limiting embodiment, in order to determine the mission phase 425, the controller 420 is provided with data from the Automatic Flight Control System (AFCS)/Flight Guidance Control System (FGCS) 402, and the Aircraft Communication Addressing & Reporting System (ACARS) 410. The AFCS/FGCS 402 are capable of providing the controller 420 with aircraft phase of flight data, to specify if the aircraft is: powering on, taking off, climbing, cruising, descending, approaching, landing, etc. Similarly, the ACARS 410 provides the controller 420 with taxi (in or out) clearance for the aircraft, specifying if the aircraft is: taxiing-in or taxiing-out.

Determining the state 422 of propulsor gearbox 214, 214 (which may be called a "transmission") may be based on the transmission 404 data the controller 420 is provided. The transmission, in one non-limiting embodiment, includes the flywheel 222, 322; gear(s) arrangement(s) of the propulsor gearbox 214, 314; and the clutch/converters 218, 318. Based on the transmission state 422 and/or the shaft encoder sensor mentioned above, the controller 420 may determine the flywheel 222, 322 configuration 426 and the clutch/converter configuration 427.

Engine state 423 is determined by the Full Authority Digital Engine Control (FADEC) 408. The FADEC 408 is the system that manages the engine(s) performance. It is capable of determining whether the engine 210, 310 is ON or OFF. Furthermore, it controls fuel flow to the engine(s), stator vane position, air bleed valve position, and other components; and provides parameters for determining engine configuration 428.

The AMS configuration 429 is determined by the AMS state 424. The state 424 in one embodiment is defined by the Air Management System (AMS) 406. The AMS configuration 429 chooses the mode in which the AMS 406 operates under the KETS/TERS.

Given the states (421-424), the controller 420 is able to determine the mission phase 425, and necessary or desirable configurations (426-429) for the KETS/TERS. In one embodiment, in addition to determining the state(s) of the aircraft relevant to systems 200, 300, the controller 420 may in one embodiment be used to output operational configurations or commands that control the mode in which KETS/TERS systems 200, 300 operate(s).

Thereafter, the controller 420 is able to choose and command the flywheel mode 430 and clutch/converter mode 440 (in some embodiment, the components themselves such as a torque converter can change modes based on the mechanical rotational state of a driven shaft), and in some embodiments, the main engine mode 450 and the AMS mode 460 (or in some embodiments, engine and AMS modes are controlled by other computers such as a flight control computer, FADEC, etc.), based on current conditions of the aircraft. Example non-limiting combination of modes are presented in Tables I & II above, and the controller 420 can execute program control instructions stored in non-transitory memory to perform the operations shown in FIGS. 5A, 5B.

The given controller 420 structure and capabilities is one non-limiting example of available methods and systems of implementing the KETS and TERS without changing the architecture of the aircraft. Additionally, there are a variety of known methods (e.g., flight data analysis, etc.) that are used to determine mission phase. The example used in FIG. 4 is non-limiting; the non-limiting technology described herein is configurable to determine all mentioned states via different sensors, systems, sub-systems, and components known to an individual skilled in the art.

All patents and publications cited herein are expressly incorporated herein by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An aircraft power arrangement including components onboard an aircraft comprising
    a) an engine;
    b) a propulsor comprising at least one rotatable element that interacts with the air to provide thrust to propel an aircraft;
    c) a mechanical flywheel; and
    d) a coupler configured to selectively mechanically couple the propulsor to either rotational energy output by the mechanical flywheel or rotational energy output by the engine, the coupler being configured to select to mechanically couple rotational energy of the mechanical flywheel to the propulsor for use in propelling the aircraft before the engine is turned on and/or after the engine is turned off, and to instead select to mechanically couple rotational energy of the engine to the propulsor to propel the aircraft during flight operations.

2. The arrangement of claim 1, wherein the coupler comprises at least one of a gearbox, a torque converter, and a clutch.

3. The arrangement of claim 2, wherein the coupler is configurable to mechanically couple rotational energy produced by at least one of the propulsor and the engine to the flywheel.

4. The arrangement of claim 1 further comprising a turbine operatively coupled to the engine, the turbine producing rotational energy that when mechanically coupled to the flywheel, rotates the flywheel.

5. The arrangement of claim 1, wherein the arrangement comprises a propulsor having at least one fan or blade.

6. The arrangement of claim 1 wherein the engine and the flywheel are mechanically connected in parallel with respect to a gearbox.

7. The arrangement of claim 1 further comprising a control system configured to command mechanical recharge and power modes of the flywheel.

8. A method of taxiing an aircraft, comprising:
    e) selecting whether a flywheel or a gas turbine engine is coupled to drive a propulsor;
    f) during approach and/or landing, the controller selectively, mechanically coupling the flywheel to the gas turbine engine to thereby store rotational energy produced by a gas turbine engine; and
    g) during taxiing, the controller mechanically decoupling the flywheel from the gas turbine engine and decoupling the gas turbine engine from the propulsor and instead mechanically coupling the flywheel to the propulsor so the flywheel outputs stored rotational mechanical energy to the propulsor and imparts taxiing thrust to the aircraft even while the gas turbine engine is turned off.

9. The method of claim 8, including an electronic controller determining flight phase as: power-on, take-off, climb/cruise, decent landing, taxi-in, and taxi-out.

10. The method of claim 8 further comprising selectively mechanically coupling the flywheel to an expansion turbine configured to mechanically provide to the flywheel, mechanical rotational energy derived from a regulated bleed air supplied to an Air Management System, the flywheel storing the mechanical rotational energy.

11. An aircraft taxiing system, comprising;
    h) a controller, configured to select the configuration(s) of a transmission and an engine, determined at least in part by phase of flight of an aircraft;
    i) a mechanical flywheel operationally mechanically coupled to the transmission and configurable to store mechanical rotational energy;
    j) the transmission configured to selectively mechanically couple mechanical rotational energy from the mechanical flywheel to the propulsor or mechanically couple mechanical rotational energy output by the engine to the propulsor, the transmission being configured to select to mechanically couple rotational energy of the mechanical flywheel to the propulsor for use in propelling the aircraft before the engine is turned on and/or after the engine is turned off, and to instead select to mechanically couple rotational energy from the engine to the propulsor to propel the aircraft during flight operations;
    k) the propulsor comprising at least one rotatable mechanical element that provides thrust to an aircraft before an engine is turned on and/or after the engine is turned off.

12. The system of claim 11, wherein the transmission comprises a gearbox and at least one of a torque converter and/a clutch.

13. The system of claim 12, wherein the transmission is configured by an electronic controller to mechanically couple rotational energy produced by the propulsor and/or the engine to the flywheel.

14. The system of claim 11 further comprising an expansion turbine that rotates based on bleed air produced by the engine, the expansion turbine mechanically applying mechanical rotational energy to the flywheel.

15. The system of claim 11, wherein the propulsor comprises a propeller having at least one fan or blade.

16. The system of claim 11, wherein the engine and the flywheel are connected in parallel with respect to the transmission.

17. An aircraft comprising:
an engine;
a propulsor comprising at least one rotatable element that interacts with the air to impart thrust to the aircraft in a first mode and operable as a wind turbine in a second mode;
a flywheel; and
a mechanical coupler operatively coupled to the engine, the propulsor and the flywheel, the mechanical coupler being configurable to alternately (a) mechanically couple rotational energy produced by the engine to the flywheel for storage by the flywheel, and (b) mechanically decouple the engine from the propulsor and instead couple rotational energy stored by the flywheel to the propulsor to impart thrust to the aircraft while the engine is not operating.

18. The aircraft of claim 17 wherein the coupler is further configurable to mechanically couple rotational energy produced by the propulsor operating in the second mode to the flywheel for storage by the flywheel.

19. The aircraft of claim 17 wherein the flywheel and associated components are configurable to operate alternatively in:
a first power mode that passes on power from a bleed air turbine to the propulsor,
a second power mode that mechanically applies flywheel stored mechanical inertia to the propulsor,
a first recovery mode that causes the flywheel to mechanically store mechanical inertia produced by the bleed air turbine, and
a second recovery mode that causes the flywheel to mechanically store inertia produced by the engine and/or by the propulsor acting as a wind turbine.

* * * * *